(12) United States Patent
Chauveau et al.

(10) Patent No.: US 8,220,922 B2
(45) Date of Patent: Jul. 17, 2012

(54) METHOD AND A DEVICE FOR DETERMINING THE ORIENTATION OF A CORRECTING OPHTHALMIC LENS, AND A METHOD OF OPTICALLY DESIGNING THE CORRECTING LENS

(75) Inventors: Jean-Pierre Chauveau, Charenton-le-Pont (FR); Fabienne Lievois, Charenton-le-Pont (FR)

(73) Assignee: Essilor International (Compagnie Generale d'Optique), Charenton-le-Pont (FR)

( * ) Notice: Subject to any disclaimer, the term of this patent is extended or adjusted under 35 U.S.C. 154(b) by 701 days.

(21) Appl. No.: 12/441,171

(22) PCT Filed: Sep. 10, 2007

(86) PCT No.: PCT/IB2007/002598
§ 371 (c)(1),
(2), (4) Date: Mar. 13, 2009

(87) PCT Pub. No.: WO2008/032173
PCT Pub. Date: Mar. 20, 2008

(65) Prior Publication Data
US 2009/0262302 A1   Oct. 22, 2009

(30) Foreign Application Priority Data
Sep. 14, 2006 (FR) ..................................... 06 08036

(51) Int. Cl.
*A61B 3/10* (2006.01)
*A61B 3/00* (2006.01)
(52) U.S. Cl. .......................... 351/204; 351/200; 351/246
(58) Field of Classification Search .................. 351/204, 351/200, 245–246
See application file for complete search history.

(56) References Cited

U.S. PATENT DOCUMENTS

| 7,384,147 B1 * | 6/2008 | Ameri ........................ 351/245 |
| 2001/0026351 A1 | 10/2001 | Gao et al. |
| 2003/0098953 A1 * | 5/2003 | Mothes ........................ 351/204 |

FOREIGN PATENT DOCUMENTS

| EP | 1450201 | 8/2004 |
| WO | 0184222 | 11/2001 |
| WO | 2005071468 | 8/2005 |
| WO | 2006029875 | 3/2006 |

OTHER PUBLICATIONS

International Search Report dated Dec. 19, 2007, in PCT application.

* cited by examiner

*Primary Examiner* — Dawayne A Pinkney
(74) *Attorney, Agent, or Firm* — Young & Thompson

(57) ABSTRACT

A device and method for determining under wearing conditions at least one component of the orientation of a correcting ophthalmic lens of eyeglasses relative to the head of a future wearer. Provision is made for mounting a position-identification system (20) on the frame (10) and/or on a presentation lens fitted to the frame, which system includes at least one identification element (60, 70, 80) having at least one known geometrical characteristic, for capturing the image of the identification element in two dimensions in a vertical facial plane, for processing the captured image to measure the captured geometrical characteristic of the image of the identification element that depends on the known geometrical characteristic of the identification element, and for calculating at least one component of the orientation of the lens by comparing the captured geometrical characteristic with the known geometrical characteristic. A method of optically designing the correcting lens is disclosed.

21 Claims, 5 Drawing Sheets

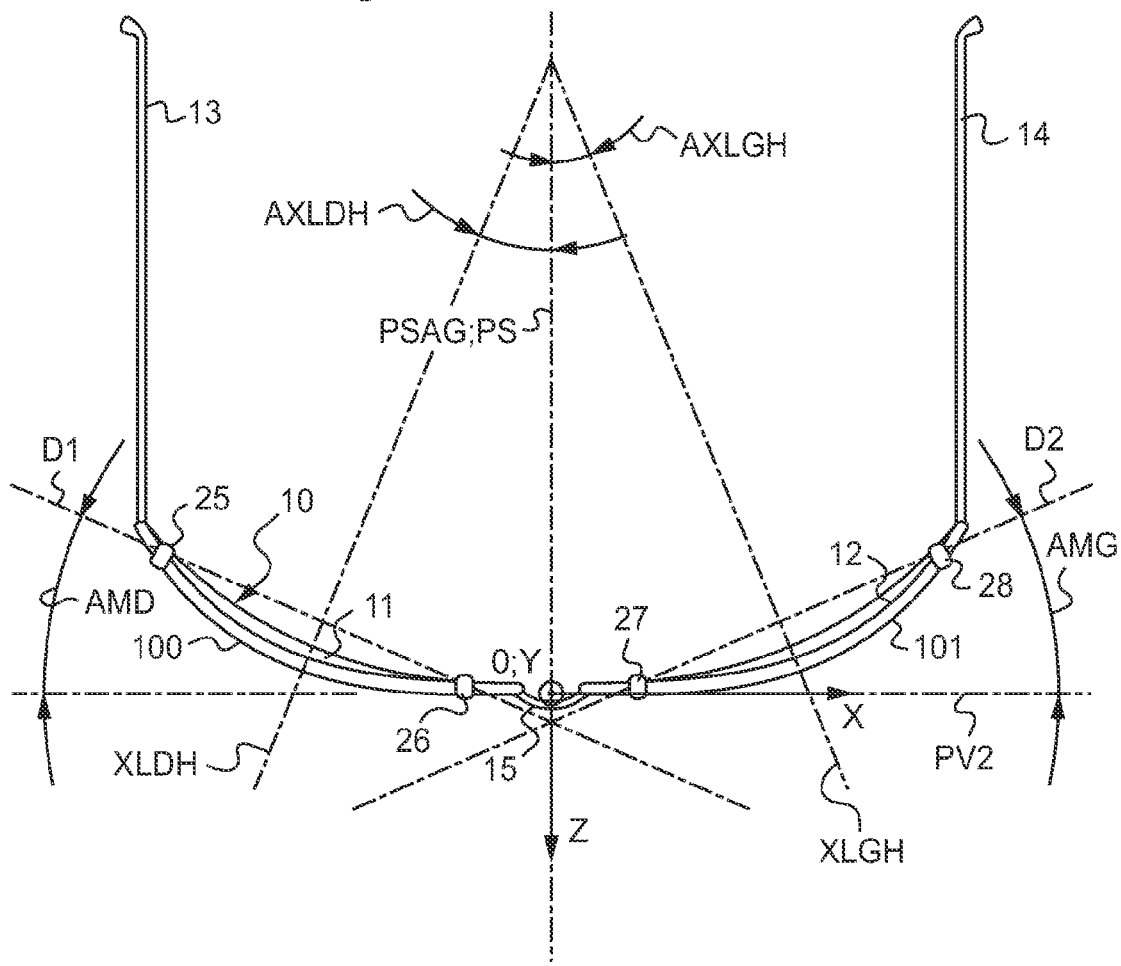
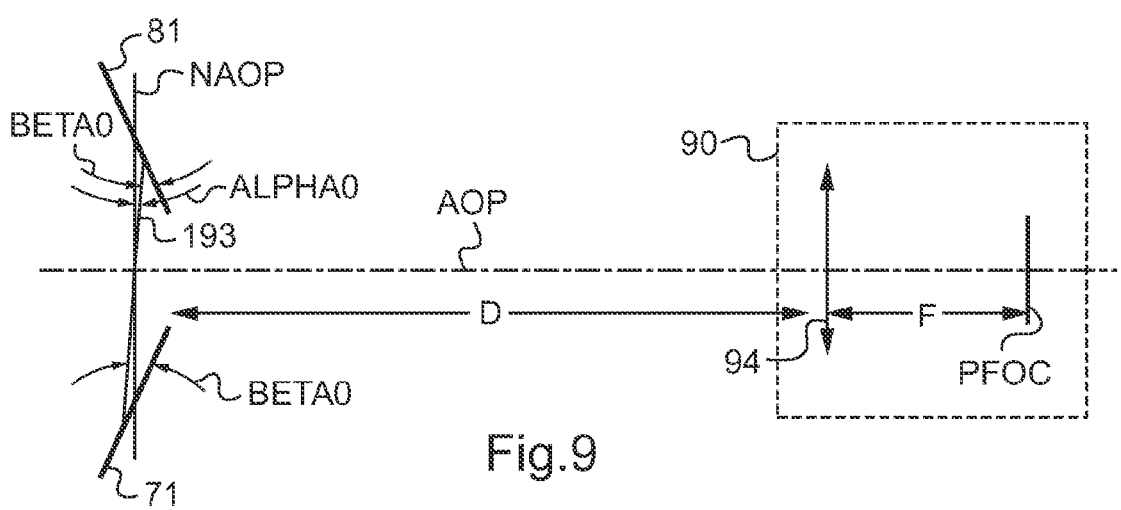

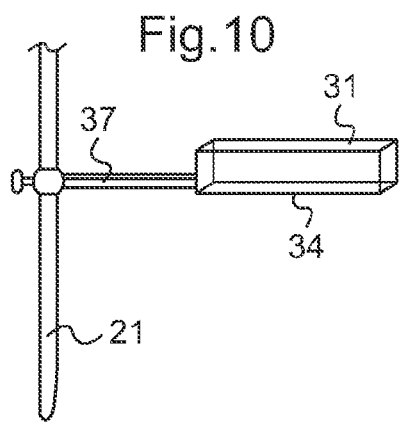
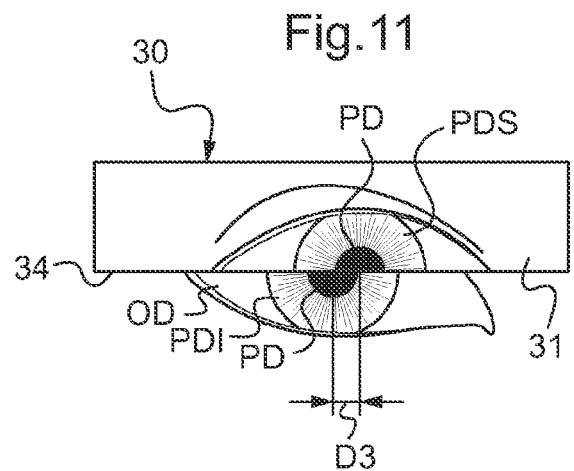
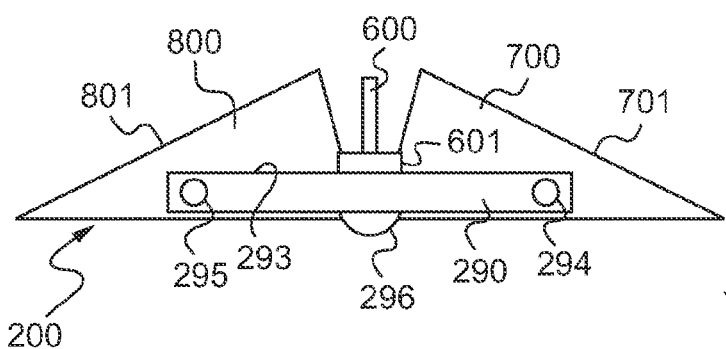
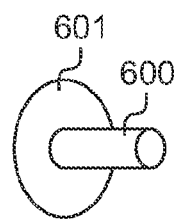
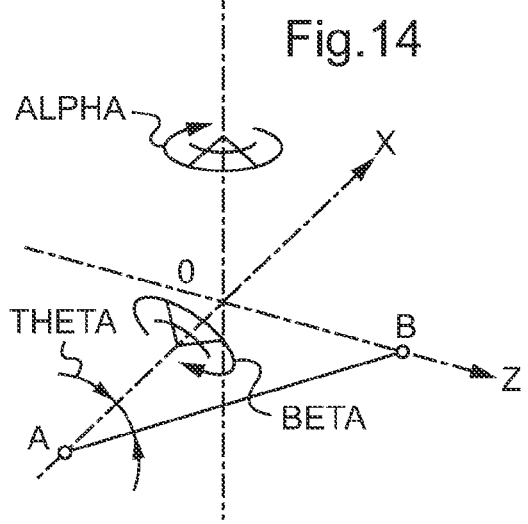
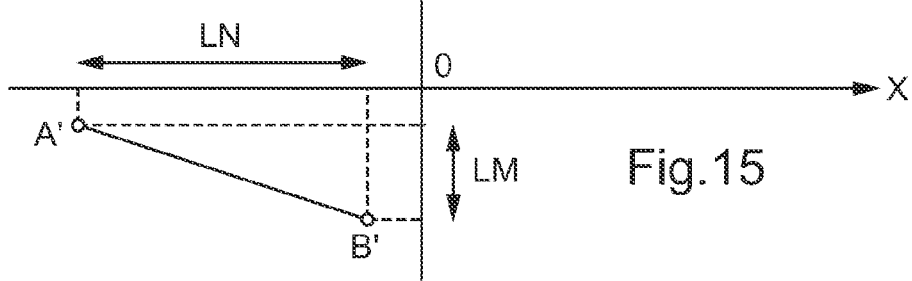

METHOD AND A DEVICE FOR DETERMINING THE ORIENTATION OF A CORRECTING OPHTHALMIC LENS, AND A METHOD OF OPTICALLY DESIGNING THE CORRECTING LENS

TECHNICAL FIELD TO WHICH THE INVENTION RELATES

The present invention relates to taking geometrico-morphological measurements of a future wearer of eyeglasses for the purpose of personalized optical design of correcting eyeglasses lenses for mounting in the frame selected by the future wearer. The invention also relates more particularly to a device and a method for determining, under wearing conditions, at least one component of the orientation of a correcting ophthalmic lens of eyeglasses relative to the head of the future wearer.

TECHNOLOGICAL BACKGROUND

During optical design of a correcting ophthalmic lens, it is presently desired to take best possible account of individual geometrico-morphological parameters for use in personalized optical design and associated with the wearer and the selected frame. These parameters comprise in particular the three-dimensional configuration of the lens relative to the wearer's head, under wearing conditions. The three-dimensional configuration is determined: i) by the orientation of the lens relative to the corresponding eye of the wearer; and ii) by the distance between the lens and the corresponding eye of the wearer.

In order to determine the orientation in three dimensions of correcting lenses for mounting, it is known to measure a first angle in the horizontal plane that corresponds overall to the wraparound curvature of the frame, and to measure a second angle in a vertical plane, which angle corresponds generally to the so-called "pantoscopic" angle that the lens forms with the vertical.

To do this, after a frame has been selected, the optician places a pair of presentation eyeglasses on the wearer's nose. The presentation eyeglasses comprise the frame selected by the wearer together with non-correcting lenses mounted in the rims of the frame.

To measure the distance between each presentation lens and the corresponding eye of the wearer, the optician observes the wearer in profile and estimates a measurement manually by using a transparent rule. Likewise, to measure the pantoscopic angle, the optician, while still observing the wearer in profile, manually estimates a measurement using a protractor having graduations that then make it possible to determine the angle between the mean plane of the lenses and the vertical.

The curvature angle can be measured by means of an apparatus specially designed to take a reading from the inner outline of each rim of the frame. Nevertheless, such an apparatus for reading frames is expensive and complex to use. To measure this angle more simply, it is also known to make the arms and the rims of the frame rest on a plate that is graduated angularly like a protractor. The graduations make it possible to evaluate approximately the angle formed in the horizontal plane by the traces of the lenses relative to a reference horizontal line that is substantially tangential to the nose bridge (and thus perpendicular to the vertical plane of symmetry of the frame).

The optician also measures two other parameters associated with the morphology of the wearer, namely the pupillary distance or the two pupillary half-distances, and also the height of the pupil relative to the frame. To measure the distance between the two pupils, or the two pupillary half-distances, the most usual solution consists in making use of a rule. It is also possible to use a specific apparatus known as a pupillometer. To determine the height of the pupil relative to the frame, the optician usually uses a rule placed on the front face of the presentation lens to measure the distance between the position of the pupil at a reference point on the frame.

The above-described operations of taking measurements of geometrico-morphological parameters thus require several different tools to be used. The optician therefore needs to perform a large number of manipulations that turn out to be expensive in time and awkward both for the optician and the wearer. The manipulations can constitute sources of error, or at least of inaccuracies. The use of a rule or of a protractor put into place on the frame and read manually and approximately leads to measurements that are often inaccurate.

It is also found that determining the orientation of each correcting lens from the curvature angle and from the pantoscopic angle is not reliable. In particular, the orientation of the lens is determined by combing rotations from those two angles, and the order in which the combination is performed has an influence on the resulting orientation of the lens.

OBJECT OF THE INVENTION

An object of the present invention is to simplify and make quicker, more accurate, convenient, and agreeable the operations of determining individual geometrico-morphological parameters for personalized optical design of a correcting lens to be mounted in a frame.

To this end, the invention provides a method of determining, under wearing conditions, at least one component of the orientation of a correcting ophthalmic lens of eyeglasses relative to the head of the future wearer, the method comprising the steps of:

mounting a position-identification system on the frame and/or on a presentation lens fitted to the frame, the identification system comprising at least one identification element having at least one known geometrical characteristic;

capturing an image of the identification element in two dimensions in a vertical facial plane by means of an image-capture apparatus;

processing the captured image of the identification element to measure therein a geometrical characteristic that depends on the known geometrical characteristic of the identification element; and calculating at least one component of the orientation of the lens by comparing the measured geometrical characteristic of the captured image of the identification element with the known geometrical characteristic of the identification element.

The position-identification system includes at least one horizontal identification element and means for mounting said element directly or indirectly on a rim of the frame or on a presentation lens fitted to the frame, the horizontal identification element being arranged so that the measured geometrical characteristic of the captured image of the identification element depends on the horizontal component, about a substantially vertical axis, of the orientation of said rim of the frame or of said presentation lens relative to the head of the wearer. At least one horizontal component of the orientation of the correcting lens relative to the head of the wearer is calculated as a function of said comparison.

The invention also provides a device adapted to implement the method.

The orientation of the correcting lens to be designed is determined in the wearing configuration by processing images, thus making it possible to take measurement without making said contact with the wearer or the visual equipment being worn and while requiring a minimum amount of manipulation on the part of the optician. The optician need merely place the position-identification system on the frame and then capture the image of the assembly worn by the wearer.

In addition, the device provides the possibility of measuring a variety of geometrico-morphological parameters using a limited number of tools and based on a single image capture. This ensures that taking measurements of geometrico-morphological parameters is faster, more reliable, and more coherent.

The measured geometrical characteristic of the captured image of the identification element as compared with the known geometrical characteristic of the identification element is representative of the looked-for component of the orientation of the lens, and therefore enables it to be calculated.

The horizontal component of the orientation of the correcting lens depends on the horizontal component of the orientation of said rim of the frame or of said presentation lens. The arrangement of the horizontal identification element on the frame thus enables the horizontal component of the orientation of the correcting lens to be determined.

According to another characteristic of the invention, that is advantageous, provision is made for:

- the position-identification system comprises at least two horizontal identification elements, of which a first horizontal identification element is mounted directly or indirectly on one of the two rims of the frame or on one of the two presentation lenses fitted to the frame, and of which a second horizontal identification element is mounted on the other rim of the frame or on the other presentation lens;
- the capture step comprises capturing an image of the horizontal identification element in two dimensions in a facial plane;
- the processing step comprises processing said captured image to measure therefrom, for each identification element, a geometrical characteristic depending on the known geometrical characteristic of the corresponding identification element; and
- the comparison step comprises making comparisons between the measured geometrical characteristics of the captured image of the identification elements with the known geometrical characteristic corresponding to said horizontal identification elements, and calculating at least one horizontal component of the orientation of each correcting lens relative to the head of the future wearer, as a function of said comparison.

The use of two horizontal identification elements makes it possible to determine the horizontal component of the orientation of the two rims of the frame or of the two presentation lenses, and thus to determine accurately the horizontal component of the orientation of the correcting lens.

According to another advantageous characteristic of the invention, a posture angle corresponding to the horizontal component of the orientation of the bisector of the eyes relative the image-capture apparatus is calculated as a function of the comparisons of the measured geometrical characteristics of the captured image of the horizontal identification elements with the corresponding known geometrical characteristics.

Thus, the pivot angle of the head by the vertical axis is determined on the basis of the difference between the measured geometrical characteristics of the captured image of the horizontal identification elements. Determining this pivot angle, known as the posture angle, makes it possible to correct the measurements taken.

According to another advantageous characteristic of the invention, the identification system includes at least one vertical identification element and means for directly or indirectly mounting said element on a rim of the frame or on a presentation lens fitted to the frame, said vertical identification element being arranged so that the measured geometrical characteristic of the captured image of said identification element depends on the vertical component, about an axis that is substantially horizontal and perpendicular to the sagittal plane of the wearer, of the orientation of said rim of the frame or of said presentation lens relative to the head of the wearer. At least one vertical component of the orientation of the correcting lens relative to the head of the wearer is calculated as a function of said comparison.

According to another characteristic of the invention, the position-identification system includes at least one vertical identification element that is mounted directly or indirectly on the frame or on a presentation lens fitted to the frame, said vertical identification element being arranged so that the comparison is representative of the vertical component of the orientation of the frame in the sagittal plane, and the looked-for orientation component comprises the vertical component of the orientation of the correcting lens.

According to another advantageous characteristic of the invention, the distance is measured between each presentation lens fitted to the frame and the corresponding eye, and at least one parameter of the configuration of the correcting lens relative to the wearer's head is calculated as a function of said distance.

According to another advantageous characteristic of the invention, the distance between the image-capture means and the position-identification system is measured. This distance makes it possible to calculate the scale factor of the captured image and also the pupillary distance between the two eyes for vision at infinity.

According to another advantageous characteristic of the invention, at least one of the following personalization characteristics is measured in the captured image while taking account of a scale factor: the pupillary distance; the pupillary half-distances; the width and height dimensions of each presentation lens; and the height of each pupil.

These parameters are geometrico-morphological parameters that make it possible, while designing the correcting lens, to distribute index gradients accurately on the lens.

According to another advantageous characteristic of the invention, the values measured in the captured image of the pupillary distance, of the pupillary half-distances, and of the width dimensions of each presentation lens are corrected as a function of the measured posture angle, and the values for the height of each presentation lens and for the height of each pupil are corrected as a function of the vertical component of the calculated orientation.

According to another advantageous characteristic of the invention, the pupillary distance, and/or the pupillary half-distances, are calculated for a wearer looking at infinity.

According to another advantageous characteristic of the invention, the pupillary distance and/or the pupillary half-distances are calculated as a function of the distance between the image-capture means and the position-identification system.

Advantageously, the same identification element is used for identifying both the horizontal and the vertical components of the orientation of the lens. When this identification element is associated with one eye, the vertical component of the orientation of the correcting lens associated with the eye is determined more precisely. The orientation of the lens is thus determined more reliably.

According to another advantageous characteristic of the invention, at least one prismatic-effect optical element associated with one of the two eyes of the wearer, the element presenting an edge parallel to the direction of its prismatic effect and being mounted to move in translation substantially vertically relative to the position-identification system so as to be capable of being placed in a measurement position such that said edge, when seen in face view, intersects the pupil of the eye so as to offset the image of a portion of the pupil, and in which the processor means are designed to respond to the image of the portion of the pupil offset by the prismatic-effect optical element to deduce the distance between the presentation lens fitted to the frame and the corresponding eye. Advantageously, for the eye in question, the device has a single prismatic-effect optical element.

According to another advantageous characteristic of the invention, means are provided for pressing the prismatic-effect optical element against the presentation lens by resilient return or by gravity.

According to another advantageous characteristic of the invention, for said identification element having at least one known geometrical characteristic representative of the orientation of the frame or of the presentation lens, said fastener means enable the system to be tilted on the frame about an axis that is substantially horizontal and contained in a midplane of the frame or of the presentation lens. When the position-identification system is designed to tilt on the frame about a horizontal axis, that makes it possible to identify the vertical component of the orientation of the frame or of the presentation lens, and thus the vertical component of the orientation of the correcting ophthalmic lens that is to be designed.

Advantageously, resilient or gravity return means are then provided for tilting the position-identification system back against the presentation lens or the frame. These return means enable the position-identification system to be tilted into a configuration that makes it possible to determine accurately the vertical component of the orientation of the correcting ophthalmic lens to be designed.

DETAILED DESCRIPTION OF AN EMBODIMENT

The description below with reference to the accompanying drawings of an embodiment given by way of non-limiting example makes it possible to understand clearly what the invention consists in and how it can be implemented.

In the accompanying drawings:

FIG. 8 is a plan view of a frame for eyeglasses fitted with presentation lenses;

FIG. 9 is a plan view showing the principles of the position-identification system and of the image capture means;

FIG. 10 is a view of means for determining the distance between a presentation lens and the corresponding eye in a variant implementation;

FIG. 11 is a front view of the FIG. 10 distance-determination means and of the corresponding eye of the wearer;

FIG. 12 is a diagrammatic plan view of the position-identification system in a variant embodiment;

FIG. 13 is a view of an antenna mounted on the position-identification system of FIG. 12;

FIG. 14 is a diagrammatic view in a frame of reference associated with the wearer, this view showing a portion of a position-identification element of the system prior to being fastened on the frame; and FIG. 15 is a diagrammatic front plane projection view of a portion of the position-identification element of the FIG. 14 system after it has been mounted on the frame.

In the description below, the configuration of the frame of reference for each correcting ophthalmic lens (not shown) that is to be mounted in a frame 10 for eyeglasses is determined in a frame of reference associated with the wearer and relative to the eyes of the wearer in the wearing configuration. The configuration of the frame of reference for each correcting ophthalmic lens relative to the frame of reference of the wearer is determined for use in implementing a method of personalized optical design for the correcting ophthalmic lens by calculating shape for one and/or the other of the optically useful faces of the lens and/or the indexed gradients of the lens as a function of the frame of reference of the lens relative to the frame of reference of the wearer.

A terrestrial frame of reference is used, for example that of the optician's office. This terrestrial frame of reference is defined by the horizontal plane PH constituted by two mutually perpendicular axes H1 and H2, and by the vertical direction V. A first vertical plane PV1 is obtained that is defined by the axes V and H1, and a second vertical plane PV2 is obtained defined by the axes V and H2.

Figure 6:
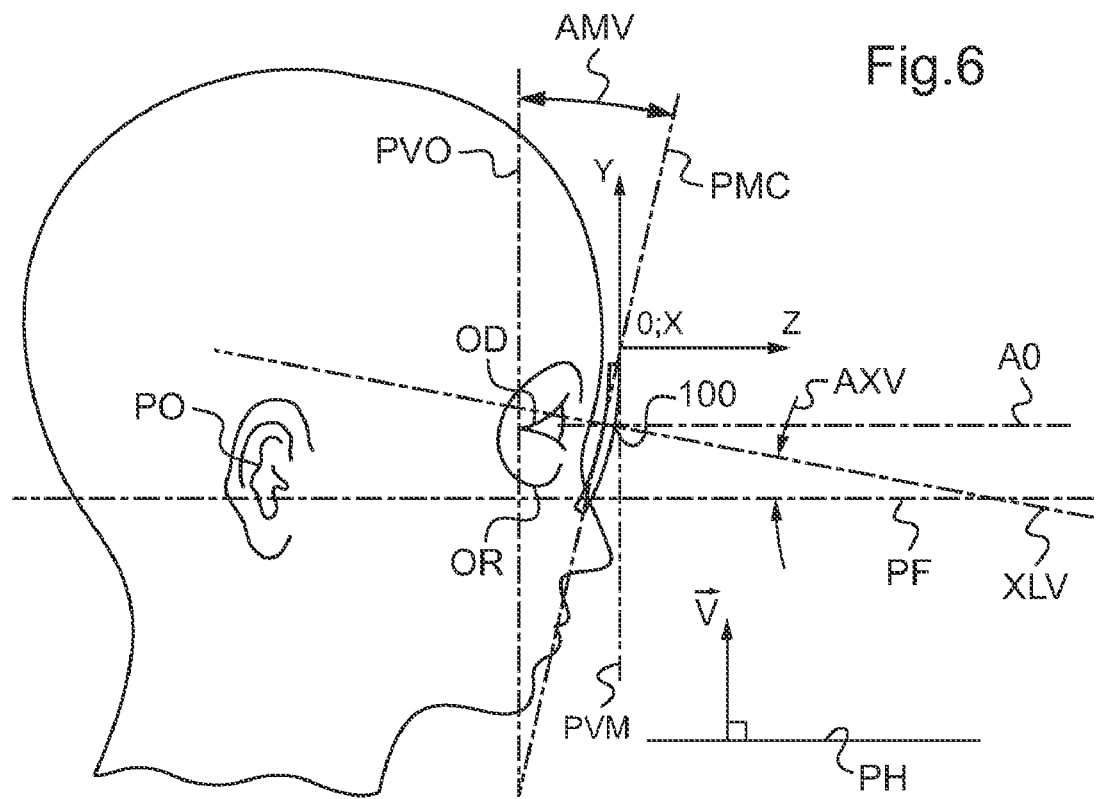
FIG. 6 is a profile view of the head of a wearer wearing presentation eyeglasses in a configuration in which the head of the wearer is straight.

The wearer is in a sitting or standing configuration with the head of the wearer being straight, i.e. Frankfurt's plane PF corresponding to the head of the wearer is substantially horizontal. As shown in FIG. 6, Frankfurt's plane PF is defined as the plane passing via the bottom orbital points OR and the left porion PO of the wearer, where the porion is the highest point in the skull of the acoustic meatus, corresponding to the tragion of the ear. The gaze axis of the wearer is the primary gaze axis, i.e. when the wearer is looking at the horizon straight in front. It is also said that the wearer is taking up an orthostatic position, a position in which effort is minimized.

A sagittal plane PSAG is defined as being the vertical plane containing the bisector AO between the two eyes OG and OD. The bisector AO between the eyes is the axis passing via the middle of the segment defined by the centers of rotation CROG and CROD of the two eyes and parallel to Frankfurt's plane PF. A vertical eye plane PVO is also defined as being the vertical plane interconnecting the centers CROG and CROD of the eyes.

The reference configuration of each correcting lens is determined by:
the orientation of each correcting lens for mounting on the frame relative to the corresponding eye of the wearer; and
the distance between the lens and the corresponding eye of the wearer, in the wearing configuration, in a horizontal direction of the sagittal plane PSAG (direction of the axis Z as defined below).

The orientation of the lens is given by the components of the vector normal to the plane tangential to the lens at the mounting cross point. This mounting cross point corresponds to a point on the lens that is to be situated in register with the pupil of the eye so that the lens exerts precisely the optical correction functions for which it was designed. The vertical component of the orientation of the lens corresponds to the angle formed by the axis or vector normal to the plane of the lens relative to the facial plane, in projection onto the sagittal plane. The horizontal component of the orientation of the lens is also defined, which corresponds to the angle formed by the axis or vector normal to the plane of the lens relative to the facial plane, as projected onto Frankfurt's plane.

The frame of reference of each correcting lens is obtained by determining the configuration of the frame of reference for each of two presentation lenses 100, 101 that are fitted to the frame for sales and measurement purposes while determining geometrico-morphological parameters relating to the wearer and to the frame, and that occupy the places of the correcting lenses that are to be designed.

Figure 5:
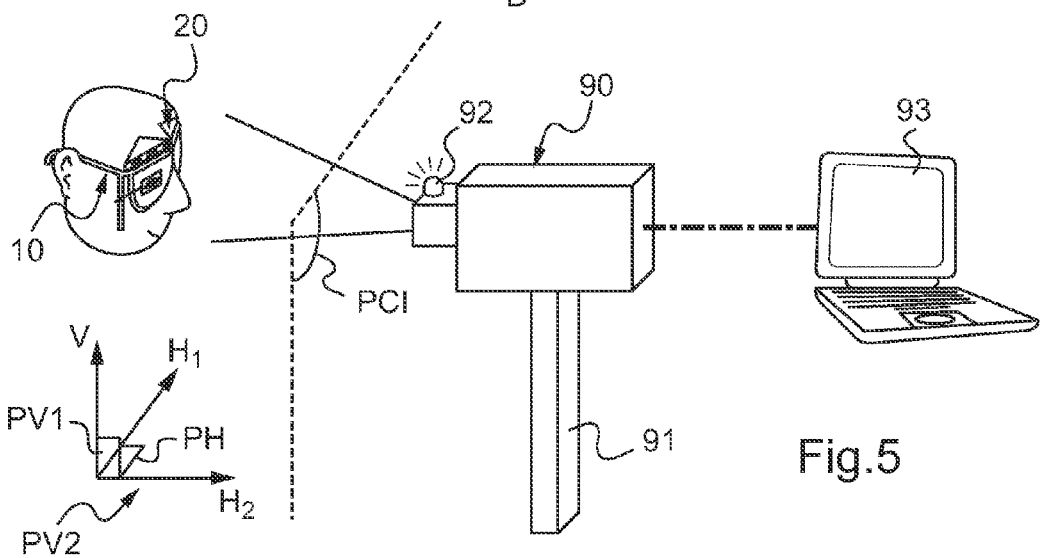
FIG. 5 is a perspective view of the FIG. 2 system for identifying position fastened on presentation eyeglasses, and of image capture means that communicate with a processor and calculation system.

FIG. 5 shows a device for determining individual geometrico-morphological parameters of a wearer wearing a pair of presentation eyeglasses. Individual geometrico-morphological parameters comprise in particular the configuration of the frame of reference of each correcting lens that is to be designed relative to the frame of reference of the wearer, and geometrico-morphological parameters as specified below.

The device comprises a position-identification system 20 for mounting on the frame 10, and image capture means 90 for capturing the image of the position-identification system 20 mounted on the frame 10 in the wearing position, the image being captured in a front image-capture plane PCI. The image-capture means 90 are connected to a processor and calculation system 93 for processing the captured image.

The pair of presentation eyeglasses comprises a frame 10 selected by the wearer, together with presentation (non-correcting) lenses 100, 101. In the example shown, the pair of eyeglasses is rimmed, i.e. each lens is mounted in a rim 11, 12 of the frame 10. In a variant, the pair of presentation eyeglasses could be of the pierced type, i.e. the lenses are pierced, and each is held by one end of a nose bridge and one end of the arm associated with the lens, the bridge and the arm co-operating with pierced holes.

Figure 1:
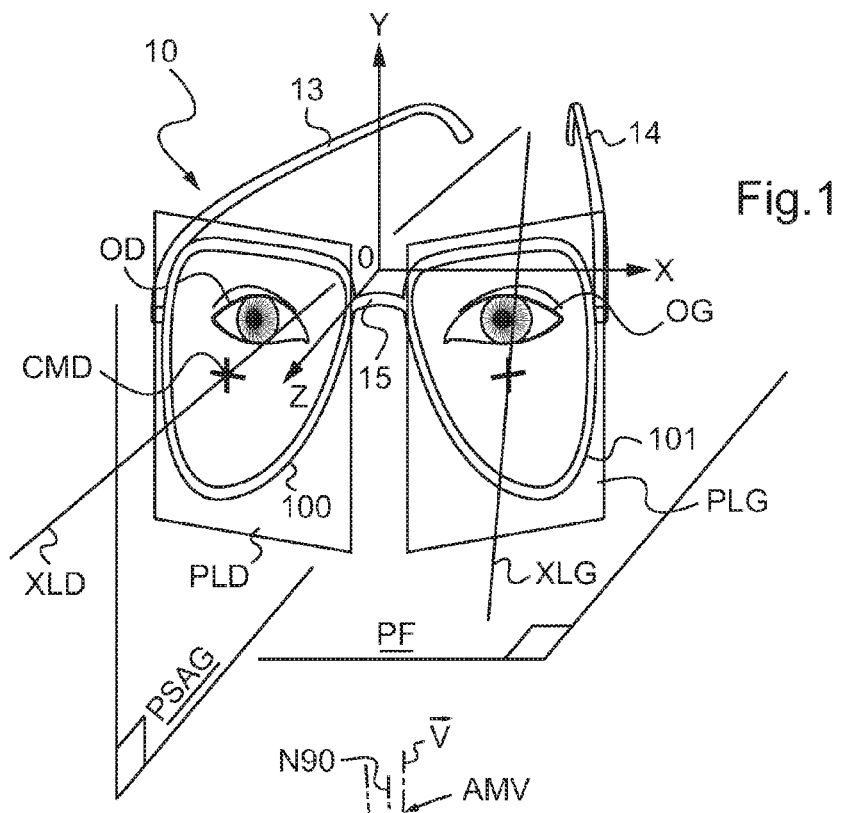
FIG. 1 is a perspective view of a pair of presentation eyeglasses.
Figure 2:
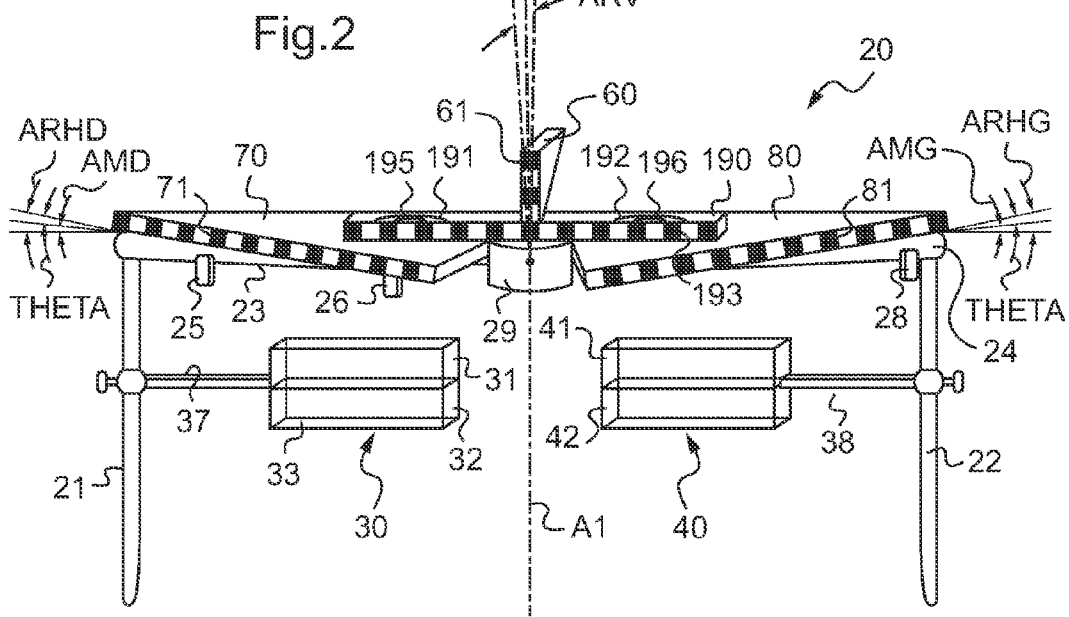
FIG. 2 is a perspective view of a position-identification system.

As shown in FIGS. 1 and 2, the position-identification system 20 comprises a hinged framework with two substantially rectilinear and substantially coplanar crossbars 23, 24 interconnected by a hinge 29 presenting a hinge axis A1 that is substantially vertical in the wearing configuration.

Each crossbar 23, 24 is provided with a pair of fastener means 25, 26, 27, 28 shown here as being in the form of clamps. These clamps enable each crossbar 23, 24 to be fastened with the capacity to pivot on the substantially horizontal top portion of the corresponding rim 11, 12 of the frame (FIG. 3) or, when the eyeglasses are of the pierced type, of the corresponding presentation lens.

Each crossbar 23, 24 is surmounted by a horizontal identification element 70, 80 in the form of a triangular plate, having a certain thickness, with an edge presenting a geometrical pattern 71, 81 designed so that the geometrical configuration of said geometrical pattern 71, 81 when projected onto said front image-capture plane PCI is representative of the horizontal component of the orientation of said horizontal identification element 70, 80. The horizontal component of the orientation of the present invention is defined by the angle between the longitudinal direction of said element and the facial plane PVO projected onto Frankfurt's plane PF. Similarly, the vertical component of the orientation of an element is defined by the angle made by the longitudinal direction of said element relative to the facial plane PVO projected onto the sagittal plane PSAG.

In this example, the geometrical pattern is made up of repeated motifs at known spacing that are constituted by dark strips alternating with pale strips so as to provide sufficient contrast. The motifs of the geometrical pattern 71, 81 extend in the longitudinal direction of the corresponding edge of the horizontal identification element 70, 80. As a result, in this example, each dark strip is substantially vertical in the wearing configuration.

Each horizontal identification element 70, 80 is fastened on the corresponding crossbar 23, 24 in such a manner that firstly the edge carrying the geometrical pattern 71, 81 is visible from in front, and secondly the direction in which the geometrical pattern extends (i.e. the longitudinal direction of the corresponding edge) forms an angle THETA in the horizontal plane PH of about 30° relative to the longitudinal direction of the crossbar 23, 24 (i.e. the straight line passing through the fastener clamps).

The two horizontal identification elements 70, 80 are also interconnected by a middle identification element 190 which is mechanically associated with the two horizontal identification elements 70, 80 so as to remain constantly in a position that is fixed relative to a vertical midplane of symmetry of the two elements 70, 80 and coinciding substantially with the plane of symmetry PS of the frame (itself coinciding substantially with the sagittal plane PSAG of the wearer). This middle identification element carries a known geometrical pattern that presents an image, when seen by the image-capture means 90 in projection onto the image-capture plane PCI, that makes it possible in combination with the images of the identification element 70, 80 to identify in three dimensions the orientation and the position of the identification system 20, as explained in greater detail below.

Specifically, this middle identification element 190 is constituted by a holder bar that presents a longitudinal direction substantially perpendicular to the plane of symmetry PS and thus to the sagittal plane PSAG. Two slots 191 and 192 of oblong shape are formed in the holder bar 190, being oriented in the longitudinal direction of the bar. The slots 191, 192 receive two guide studs 195, 196 attached to the top faces of the identification elements 70, 80. Each identification means 70, 80 can then slide relative to the holder bar 190 in the longitudinal direction of the bar. The studs 195, 196 guide the movement of the identification means 70, 80 along the slots.

This sliding movement of the identification means 70, 80 relative to the holder bar 190, in combination with their pivoting movement about the pivot axis A1 enables the horizontal identification elements 70, 80 to be fastened without stress on the rims 11, 12 by means of the crossbars 23, 24 in such a manner as to follow freely the horizontal component of the orientation of the rims 11, 12 and/or the lenses of the frame 10.

The holder bar 190 also includes on its edge facing the image-capture means 90 a geometrical pattern 193 constituted by dark strips spaced apart from one another by a known distance. As explained below, these dark strips can be used for calculating the distance between the position-identification system 20 and the image-capture means 90, thereby determining the scale factor of the captured image.

Centering means are also provided that enable the position-identification system 20 to be centered on the plane of symmetry PS of the frame so that the nose bridge 15 is centered on the axis A1.

The position-identification system 20 also includes a vertical identification element 60 that is constituted by a triangular plate of given thickness extending in a plane that is substantially perpendicular to the mean plane of the two horizontal identification elements 70, 80 associated with the lenses 101, 100. This identification element 60 presents a geometrical pattern 61 on one of its edges that is for facing towards the image-capture means 90, which pattern 61 is constituted by geometrical motifs that are constituted, as above, by dark strips separated from one another by a known distance and extending in the longitudinal direction of the corresponding edge of the identification element 60. In this example, this results in each dark strip being disposed substantially horizontally in the wearing configuration, and in the geometrical pattern 61 extending in a substantially vertical direction.

The vertical identification element 60 is fastened on the top face of the holder bar 190 in its center. The edge of the element 60 carrying the geometrical pattern 61 extends in a plane that is substantially parallel to the line interconnecting the centers of rotation CROG, CROD of the eyes and forming, in the sagittal plane PSAG, a constant angle GAMMA of 30° with the normal N90 to the plane of the top face of the holder bar 190 (FIG. 2).

Close to the free ends of the crossbars 23, 24, there are provided two mutually parallel uprights 21, 22 that are perpendicular to the crossbars 23, 24. In the wearing configuration, the uprights 21, 22 are substantially vertical. When the position-identification system 20 is fastened on the frame, the uprights 21, 22 are situated beside the right and left temples of the wearer, close to the arms 13, 14 of the frame 10 (see FIG. 3).

Figure 4:
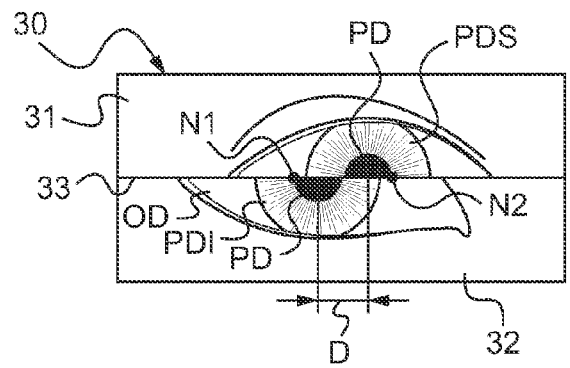
FIG. 4 is a view of the means for determining the distance between a presentation lens the corresponding eye.

Two horizontal rods 37, 38 are mounted to slide along the uprights 21, 22. On its end pointing towards the other rod, each rod has a prism pair 30, 40, constituted by pairs of prisms 31 & 32, 41 & 42 having mutually opposite slopes. As shown in FIG. 4, a line of separation 33 appears between the two prisms in each pair. The two prisms deflect light rays in the horizontal direction H1, or along the axis OX, by the same amount but in opposite directions. Each prism pair 30, 40 serves, as explained below, to measure the distance between each lens 100, 101 and the corresponding eye OD, OG. The structure of the position-identification system 20 is designed in such a manner that, when the position-identification system 20 is fastened on the frame 10 placed on the nose of the wearer, the prisms 31, 32, 41, 42 come to bear under gravity against the presentation lenses 100, 101. This bearing under gravity is obtained by designing the position-identification system in such a manner that its center of gravity is situated towards the front, i.e. on the same side as the geometrical patterns. It is also possible to weight the fronts of the triangular plates. In a variant, in order to press the prisms against the lenses, it is possible to provide resilient return means acting on the uprights 21, 22 carrying the prisms.

The rods 37, 38 that support the prism pairs 30, 40 are horizontally stationary relative to the uprights 21, 22 of the position-identification system 20. The prisms are thus designed to extend horizontally over a sufficient extent to enable the pupils PG, PD of the wearer to be covered, regardless of the magnitude of the pupillary distance of the wearer.

The image-capture means 90 typically comprise a digital camera that is portable or a camera that is mounted on a support or a stand. In the example shown, the image-capture means 90 are provided with a stand 91 that is adjustable in height to make it easy to capture an image of the entire frame 10 and position-identification system 20 worn by the wearer.

The image-capture means 90 are designed in such a manner that the image is captured while the wearer is in a sitting position. The image-capture means 90 are thus relatively small and can be placed on a table facing the seat on which the wearer is sitting. In a variant, provision could be made for the image-capture means to be designed to capture images while the wearer is in a standing configuration.

The image-capture means 90 preferably include a light-emitting diode (LED) 92 which serves firstly to obtain a corneal reflection that is easily identified in the captured image, and secondly to draw the wearer's attention towards said LED, which is in a position that is known. This facilitates processing the captured image.

The processor and calculation system 93 acting on the acquired image comprises a microcomputer having processing and calculation software installed thereon to act on the acquired image. In a variant, provision can be made for the processor and calculation system to be an independent system comprising firstly a display screen for communicating the results obtained, and secondly connector means for communicating the results to other appliances. With an independent processor system, provision can also be made for the system to be optionally integrated in the image-capture means 90.

The above-described determination device can enable the following method to be implemented for determining relative to the frame of reference of the wearer the configuration of the frame of reference for each correcting lens that is to be mounted in the frame.

The method described below for the right eye OD is naturally also valid for the left eye OG.

As shown in FIG. 5, the optician places the presentation pair of eyeglasses carrying the position-identification system 20 on the wearer's nose. The wearer may be in a sitting or standing position and holds the head straight, i.e. with Frankfurt's plane PF substantially horizontal.

Figure 3:
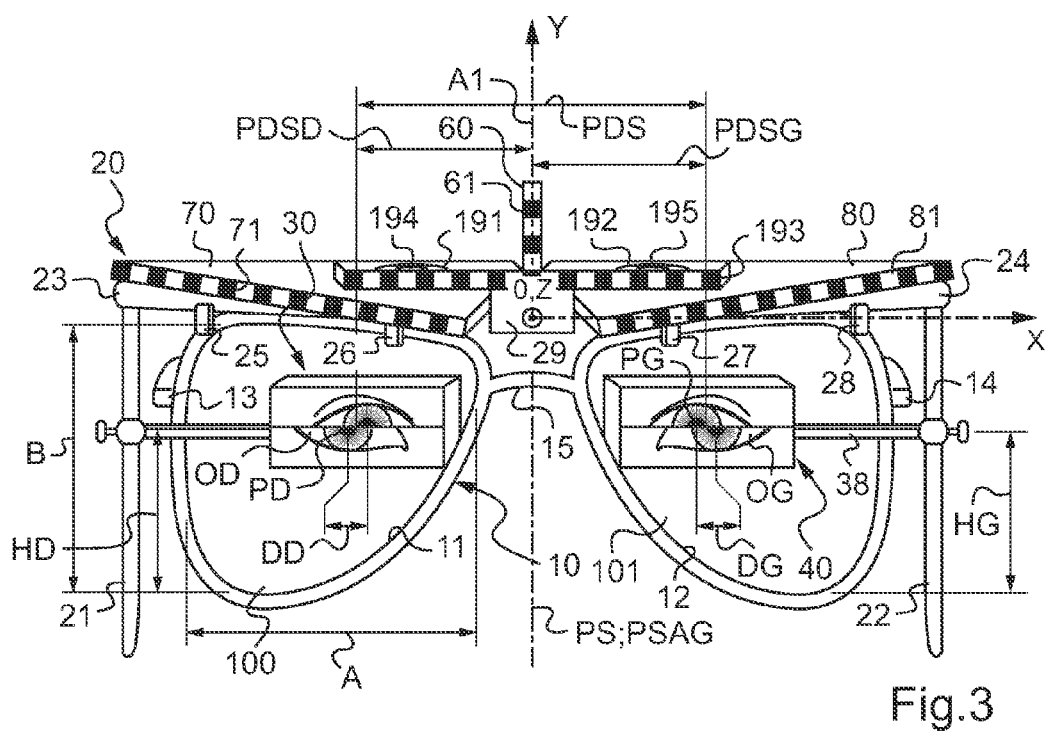
FIG. 3 is a diagrammatic view of the image of the presentation eyeglasses and of the position-identification system as captured in a front view.

As shown in FIG. 3, the two fastener clamps 25, 26 of the crossbar 23 are applied to the top portion of the right rim 11 of the frame 10. Similarly, the two fastener clamps 27, 28 of the crossbar 24 are applied to the top portion of the left rim 12 of the frame 10. Preferably, the fastener clamps 25 & 26 and 27 & 28 of each pair are spaced apart as far as possible from each other so that the corresponding crossbar 23, 24 follows the horizontal component of the orientation of the rim 11, 12 on which it is fastened. The horizontal component of the orientation of each rim corresponds overall to the inclination of the associated presentation lens relative to the sagittal plane, in projection onto Frankfurt's plane.

The holder bar 190 serves to ensure that the two horizontal identification elements 70, 80 remain substantially coplanar. As a result, the vertical identification element 60 does indeed extend in the plane of symmetry of the frame when the position-identification system 20 is mounted on the frame 10 (see FIGS. 3 and 5).

Each prism pair 30, 40 carried by the rod 37, 38 of adjustable height is placed by the optician in register with the pupil PG, PD of the corresponding eye. More precisely, in a front view of the wearer, the optician causes the line of separation 33 in each prism pair 30, 40 to pass through the center of the corresponding pupil PG, PD (FIG. 4).

The position-identification system 20 is designed in such a manner that each prism pair 30, 40 placed in register with the associated pupil PG, PD bears under gravity against the front face of the corresponding presentation lens 100, 101. The prisms 30, 40 are caused to bear under gravity against the corresponding presentation lens 100, 101 by the crossbar 23, 24 tilting about a tilt axis that is substantially parallel to the axis passing through the centers of the two pupils (and thus substantially perpendicular to the sagittal plane PSAG and parallel to the axis X as defined below). The fastener clamps thus act as hinges to enable the position-identification system to tilt about the tilt axis.

As a result, the normal N90 to the plane of the top face of the holder bar 190 follows the vertical component of the orientation of the frame 10, which corresponds overall to the angle of inclination in the sagittal plane PSAG of the mean plane of the rims of the frame relative to the vertical plane PVO (FIG. 6).

The two points where the fastener clamps 25, 26 bear against the rim 11 of the frame 10 and the point where the prism pair 30 bears against the presentation lens 100 (i.e. the point corresponding to the mounting cross) define a mean plane PLD for the presentation lens 100 that is associated with the mean plane of the correcting lens when in the wearing configuration (FIGS. 1 and 3). The same plane PLG of the lens presentation 101 is defined as passing through the two bearing points of the fastener clamps 27, 28 on the rim 12 of the frame 10 and the point where the prism pair 40 bears against the presentation lens 101.

As shown in FIG. 1, a frame of reference is defined that is associated with the frame (and thus indirectly with the head of the wearer) and that presents mutually orthogonal axes (O, X, Y, Z) and referenced 20. By way of example, the center O of this frame of reference is at the middle of the segment interconnecting the fastener clamps 26, 27. The X axis is horizontal passing through the clamps 26, 27. The Y axis is perpendicular to Frankfurt's plane, and is thus vertical in this example. The OYZ plane is then vertical and corresponds to the sagittal plane PSAG and also to the plane of symmetry PS. The axis OZ is parallel to the bisector AO of the eyes. The plane OXZ is parallel to Frankfurt's plane PF and in this example is thus horizontal. The plane OXY is referred to as the frame vertical plane PVM and is substantially parallel to the front image-capture plane PCI.

The orientation of each lens is given by the components, in the (O, X, Y, Z) frame of reference, of the vector normal to the plane that is tangential to the lens at the mounting cross point CMG, CMD. This mounting cross corresponds to a point of the lens that is to be situated in register with the pupil of the eye of the wearer so that the lens exerts precisely the optical correction functions for which it is designed. The vertical component of the orientation of the lens corresponds to the angle formed by the axis or vector that is normal to the plane of the lens relative to the facial plane, in projection onto the sagittal plane. The horizontal component of the orientation of the lens is also defined as corresponding to the angle formed by the axis or vector normal to the frame of the lens relative to the facial plane in projection onto Frankfurt's plane.

The orientation of the planes PLG, PLD needs to be determined in order to know the orientations relative to the frame of reference of the wearer of each of the correcting lenses that are to be made. To determine the orientation of each of the planes PLG and PLD, the orientations of the axes XLG and XLD are determined, which axes pass through the points where the prism pairs 30, 40 bear against the presentation lenses 100, 101 and they are normal to the planes PLG, PLD.

As shown in FIG. 8, the axes XLGH and XLDH are defined as the projections of the axes XLG, XLD onto the horizontal plane or Frankfurt's plane. Similarly, the axes XLV are defined as the projections of the axes XLG, XLD onto the sagittal plane (FIG. 6). It is assumed here that the projections of the axes XLG, XLD onto the sagittal plane both give the same projected axis XLV. In a variant, it is possible to distinguish between the two projections of the axes XLG, XLD onto the sagittal plane.

The horizontal component of the orientation of each lens 100, 101 thus corresponds to the angle AXLGH, AXLDH formed by the axis XLGH, XLDH with the sagittal plane PSAG of the wearer's head. Likewise, the vertical component of the orientation of each lens 100, 101 corresponds to the angle AXV formed by the axis XLV with Frankfurt's plane. It then remains to determine the angles AXLGH, AXLDH, and AXV in order to determine the orientation of each lens relative to the wearer.

The angle AXLDH formed between the axis XLGH and the sagittal plane PSAG corresponds substantially to the angle AMD formed in the horizontal plane PH between firstly the straight line D1 passing through the fastener clamps 25, 26 situated on the right rim 11, respectively close to the nose bridge 15 and to the right arm 13, and secondly the frame vertical plane PVM. Similarly, the angle AXLGH corresponds substantially to the angle AMG formed firstly between the straight line D2 passing through the fastener clamp 27, 29 situated on the left rim 12 close to the nose bridge 15 and to the left arm 14, and secondly the frame vertical plane PVM. In order to determine each of the angles AXLGH and AXLDH, it thus suffices to determine the angles AMG and AMD.

Similarly, as shown in FIG. 6, the angle AXV is substantially equal to the angle AMV formed, in projection onto the sagittal plane PSAG, between firstly the vertical plane PVO passing via the eyes OG, OD and perpendicular to the sagittal plane PSAG of the lenses, and secondly the mean plane PMC of the two lenses 100, 101 (or of the two rims 11, 12 of the frame 10). To determine the angle AXV, it suffices to determine the angle AMV.

The optician places the portable image-capture apparatus 90 to face the wearer's head, adjusts the stand 91 of the image-capture means 90, and, in the capture plane PCI, captures the image of the wearer's head wearing the presentation pair of eyeglasses surmounted by the position-identification system 20. The resulting image corresponds to the image of FIG. 3. Image capture is typically performed at a distance from the wearer lying in the range 50 centimeters (cm) to 120 cm in a capture plane PCI. The capture plane PCI is facial, i.e. substantially parallel to the planes PVO and PVM (FIGS. 5 and 6).

As shown in FIG. 2, the angle ARHD is defined as being the angle formed in the horizontal plane PH or Frankfurt's plane PF between firstly the frame vertical plane PVM and secondly the longitudinal direction of the geometrical pattern 71. When this angle ARHD varies, the spacing between the black strips also varies in projection onto the image-capture plane PCI parallel to the plane PVM. This angle ARHG is equal to the sum of the angle AMG plus the constant angle THETA equal to 30°. The angle ARHD thus varies in the same manner as the angle AMD. The same applies to the horizontal identification element 80 for which the angle ARHG is defined as being the sum of the angle AMG plus the constant angle THETA of 30°.

The processor and calculation system 93 measures the spacing between the dark strips of the geometrical pattern 71 of the horizontal identification element 70 in the image it has captured, in the wearing configuration. In order to limit measurement errors on the captured image, due to the pixels of the captured image, the processor and calculation system 93 measures the spacing between the strips in pairs and calculates the mean of the spacing. Thereafter, by comparison with a reference configuration for the geometrical pattern 71 for which the angle ARHD and the spacing between the strips is known, the system determines the variation in strip spacing between the wearing configuration and the reference configuration. Thereafter, the processor and calculation system 93 determines that angle ARHD as a function of said spacing variation. The angle AMD is then determined on the basis of the angle ARHD.

In order to make a valid comparison of the spacings between the strips, the processor and calculation system needs to take account of the scale factor of the captured image. Knowledge of the scale factor serves to reduce the strip spacing values measured in the captured image and the reference strip spacing values to a common scale so as to be able to compare the strip spacings. The scale factor is determined from the distance between the position-identification system and the image-capture means.

The separation distance, referenced D, can be obtained by the calculation method that is explained below.

As shown diagrammatically in FIG. 9, when the determination device is viewed from above, the longitudinal direction of the geometrical pattern 193 of the holder bar 190 forms an angle ALPHA0 with the normal NAOP to the optical axis AOP. Likewise, the longitudinal direction of each geometrical pattern 71, 81 of the corresponding identification elements 70, 80 forms an angle BETA0 with the longitudinal direction of the geometrical pattern 193 of the holder bar 190. It is also assumed that the geometrical patterns 71, 81 are both of the same known length H and that the geometrical pattern 193 likewise possesses a length L that is known.

Making use of the spacing between the dark strips, the apparent length T of the geometrical pattern 193 of the holder bar 190 is measured in the focal plane PFOC of the lens 94. The following relationship applies:

$$L*\cos(ALPHA0)*F/D=T$$

where F is the focal length of the lens 94, and D is the distance between the image-capture apparatus 90 and the origin O of the frame of reference associated with the position-identification system 20.

The apparent lengths T1 and T2 of the geometrical patterns 71 and 81 in the focal plane PFOC are also measured. The following relationships apply:

$$H*\cos(BETA0-ALPHA0)*F/D=T1$$

and $$H*\cos(BETA0+ALPHA0)*F/D=T2$$

An approximation is then calculated for BETA0 by summing the two apparent lengths T1 and T2:

$$T1+T2=2*\cos BETA0*\cos ALPHA0*H*F/D$$

and assuming that cos ALPHA0 is close to 1, the following is obtained:

$$T1+T2=2*\cos BETA0*H*T/L$$

from which it is possible to deduce an approximate value for BETA0.

Thereafter, the ratio K between these two lengths is calculated to eliminate H*F/D:

$$K = \frac{(\cos BETA0 \cos ALPHA0 + \sin BETA0 \sin ALPHA0)}{(\cos BETA0 \cos ALPHA0 - \sin BETA0 \sin ALPHA0)}$$

Since the values of K and BETA0 are known, ALPHA0 can be calculated using the following relationship:

$$\tan(ALPHA0) = \frac{[(K-1)*\cos BETA0]}{[(K+1)*\sin BETA0]}$$

The distance D is thus deduced therefrom using the measurement for T, given that the values of F and L are known:

$$D=L*\cos(ALPHA0)*F/T$$

It is also possible to use a laser diode telemeter to determine said separation distance directly.

The processor and calculation system 93 also measures the spacing between the dark strips of the geometrical pattern 81 of the horizontal identification element 80 in the captured image, in the wearing configuration. As above, in order to limit measurement errors in the captured image due to the pixels of the captured image, the processor and calculation system 93 measures the spacing between the strips in pairs and calculates the mean of the spacing. Thereafter, by comparison with a reference configuration for the geometrical pattern 81 in which the angle ARHG and the spacing between the strips is known, it determines the spacing variation between the strips in the wearing configuration and in the reference configuration. The strip spacings are compared while taking account of the scale factor of the captured image. Thereafter, the processor and calculation system 93 determines the angle ARHG as a function of said spacing variation. The angle AMG is then determined from the angle ARHG.

As shown in FIG. 2, the angle ARV is determined as being the angle formed in projection onto the sagittal plane PSAG between firstly the frame vertical plane PVM and secondly the longitudinal direction of the geometrical pattern 61. When this angle ARV varies, the spacing between the dark strips varies likewise in projection onto the image-capture plane PCI. This angle ARV is equal to the sum of the angle AMV plus the constant angle GAMMA of 30° formed by the geometrical pattern 61 relative to the normal N90. The angle ARV thus varies in the same manner as the angle AMV.

The processor and calculation system 93 then measures the spacing between the strips of the geometrical pattern 61 on the image it has captured. As before, a reference configuration is provided for the geometrical pattern 61 in which the data pair constituted by the angle ARV and the spacing between the strips is known. By comparing the values measured for strip spacing in the captured image with the reference values for the strip spacing, the processor and calculation system 93 deduces the spacing variation. As before, the strip spacings are compared while taking account of the scale factor of the captured image. Thereafter, the processor and calculation system determines the angle ARV as a function of said spacing variation. The angle AMV is then determined from the angle ARV.

The processor and calculation system thus determines the orientations of the axes XLG, XLD of the left and right lenses relative to Frankfurt's plane and relative to the sagittal plane PSAG. Consequently, the orientations of the planes associated with each of the left and right presentation lenses are known in the frame of reference of the wearer. The orientation of each correcting lens for mounting in the frame is then known relative to the corresponding eye.

In order to calculate the distance between the lens 100 and the eye OD, the processor and calculation system 93 determines the horizontal offset DD between the center of the top portion PDS of the image of the pupil PD deflected by the first prism 31 and the center of the bottom portion PDI of the image of the lens PD as deflected by the second prism 32 (FIG. 4).

The processor and calculation system 93 then determines the distance in a horizontal direction from the sagittal plane PSAG, i.e. along the Z axis, between the lens 100 and the eye OD on the basis of the offset DD by means of a proportionality relationship. The distance between the lens 101 and the eye OG is likewise determined from the horizontal offset DG measured between the top and bottom portions of the image of the eye OG as seen through the prism pair 40.

The configuration of the frame of reference for each correcting lens that is to be made relative to the eyes of the wearer is then deduced from the distance between each lens 100, 101 and the corresponding eye OD, OG, and from the orientation of each lens.

In a wearing configuration in which the wearer is looking straight ahead, i.e. in which the sagittal plane PSAG is perpendicular to the image-capture plane PCI, the angle AMG must be equal to the angle AMD.

When the angles AMG, AMD present different values, it can then be deduced that the head of the wearer was turned about the vertical through a given posture angle APIV.

Figure 7:
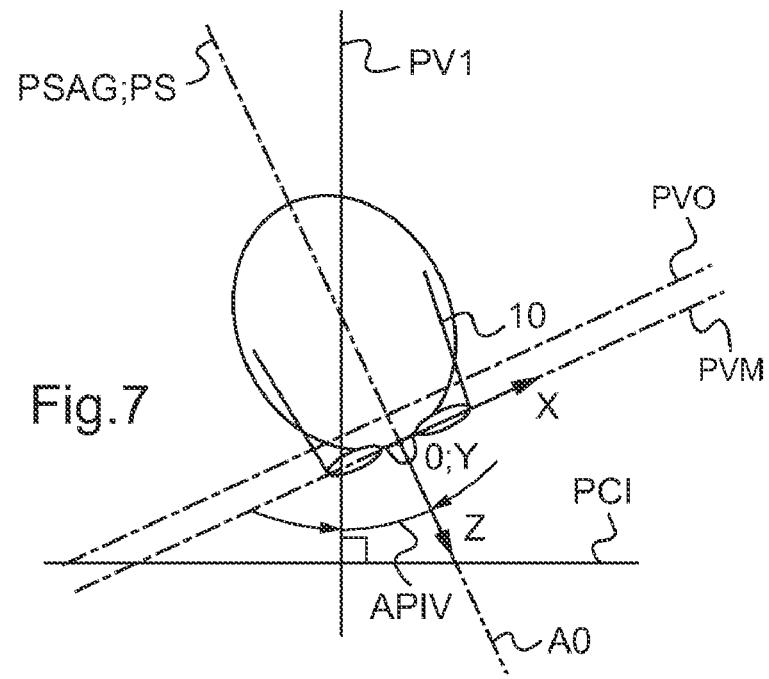
FIG. 7 is a plan view of the wearer wearing the presentation eyeglasses in a configuration where the head is turned through a certain angle.

As shown in FIG. 7, the posture angle APIV is the angle formed in the horizontal plane PH between the bisector AO between the two eyes and the axis normal to the image-capture plane PCI.

The difference in value between the angle AMG and the angle AMD is proportional to the value of the posture angle APIV. The processor and calculation system 93 then calculates a value for the posture angle APIV as a function of the measured difference in value between the angles AMG and AMD. This value for the posture angle APIV serves to correct the values of the angles AMG and AMD.

In addition, in order to improve the personalization with which each lens is designed optically, geometrico-morphological parameters are also determined that serve to improve the distribution of index gradients while designing the lens.

The processor and calculation system 93 thus performs image recognition, taking account of the scale factor, to determine the dimensions for the width dimension B and the length dimension A of each of the rims 11, 12 surrounding the presentation lenses. The processor and calculation system 93 also uses image recognition to determine the height HG, HD of the corresponding eye OG, OD by measuring a distance in the captured image, while taking account of the scale factor, which distance is the distance between the separation line 34 positioned on the center of the pupil PG, PD and the reference point taken as being the lowest point of the lens.

In order to measure the pupillary distance PDS, the processor and calculation system 93 uses image recognition to determine, for each eye, the center of the segment defined between the points N1 and N2 (FIG. 4). The points N1 and N2 are defined by the furthest-apart points of intersection between the separation line 34 and the deflected images of the bottom and top outlines of the pupil. The deflections due to the prisms in each prism pair are of the same magnitude but of opposite directions, so that the center of the segment N1 N2 as defined above does indeed correspond to the non-deflected center of the pupil. The segment defined by the centers of the two pupils PG and PD as obtained in this way provides the pupillary distance PDS. It is also possible to measure the pupillary half-distances PDS1, PDS2 by measuring the horizontal position of the center of each pupil PG, PD relative to the center of the nose bridge 15.

The pupillary distance PDS or the pupillary half-distances PDS1, PDS2 are measured in this example for a reference convergence configuration. In this reference convergence configuration, provision is made for the eyes of the wearer to stare steadily at a light on the image-capture means, e.g. the LED 92. The processor and calculation system then acts as a function of the capture distance and of the corresponding measured value for the pupillary distance PDS (or for the half-distances) to determine the value of said pupillary distance for vision at infinity.

Naturally, all of the measurements performed on the image take account of the scale factor.

It is also possible to improve the accuracy with which values are calculated for the pupillary distance, the pupillary half-distances, and the width dimension A, by correcting the calculated values as a function of the previously-calculated angles AMD, AMG, or as a function of the posture angle APIV, or as a function of the difference between the distances between the eyes OD, OG and the corresponding lenses 100, 101. Similarly, the measurement of the height dimension B and of the height HG, HD of the pupil of each eye can be improved by taking account of the value of the angle AMV.

The inclinations of the longitudinal directions of the geometrical patterns 71, 81 relative to the longitudinal directions of the crossbars 23, 24 are used to increase the values of the spacing variations between the strips when the angles AMG, AMD vary. The spacing between two strips that results from variation in the angles AMG, AMD relative to the known reference configurations is thus more easily identifiable. Thus, comparing the spacings is representative of the horizontal component of the orientation of each of the rims 11, 12 of the frame, and thus of each lens, thereby limiting measurement errors.

The same applies to the inclination of the longitudinal direction of the geometrical pattern 61 relative to the normal N90. This inclination increases the values of the spacing variations between the strips when the angle AMV varies.

In a variant, as shown in FIG. 10, it is possible to use only one prism 31 per eye. Its bottom edge 34 then acts as the line of separation. As shown in FIG. 11, the line of separation defined by the bottom edge 34 is placed over the center of the wearer's pupil PD. The image of the top portion of the pupil is deflected horizontally through a distance D3, while the image of the bottom portion of the pupil is visible directly by the image-capture means 90 without being deflected. As above, the distance D3 is used to deduce the distance between the lens 100 and the eye OD. The distance between the eye OG and the lens 101 is deduced similarly.

In addition, since the image-capture means 90 can see directly the bottom portion of each eye, the processor and calculation system 93 can measure the pupillary distance PDS or the pupillary half-distances PDS1, PDS2 directly from the captured image, taking the scale factor into account. Eliminating one prism from each eye also makes it possible to reduce the number of parts used, and thus achieve a saving in weight.

A second embodiment is also provided that reuses some of the elements of the first embodiment shown in particular in FIGS. 2 and 3. As shown in FIG. 12, there can be seen a position-identification system 200 comprising an identification element 700 associated with the left eye OD of the wearer, or the left lens, and an identification element 800 associated with the right eye OD of the wearer, or of the right lens. As before, each identification element 700, 800 has an edge presenting a geometrical pattern 710, 810 that extends in the longitudinal direction of the edge. As before, the identification elements 700, 800 are mounted on crossbars so that each geometrical pattern 710, 810 forms an angle THETA of about 30° relative to the longitudinal direction of the corresponding crossbar.

There are likewise pivot means 296 for pivoting the two identification elements 700, 800 about a vertical axis in the wearing configuration.

There is likewise a holder bar 290 having oblong openings along which guide studs 294, 295 attached to the identification elements 700, 800 can be moved. In this second embodiment, the vertical identification element 60 present in the first embodiment is omitted.

As in the first embodiment, the crossbars are provided with fastener means that are placed on the rims of the corresponding lenses.

Prisms (not shown) such as those described for the first embodiment and shown in FIG. 2 or 10 are likewise used for measuring the distance between each eye and the corresponding lens. These prisms come to bear against the presentation lenses at the positions of the mounting crosses so as to make it possible, as before, to define the planes PLG and PLD (FIG. 1) that are tangential to the presentation lenses at the positions of the mounting crosses. These planes PLG and PLD are considered as being likewise the planes tangential to the to-be-designed correcting lenses at their mounting cross points. Determining the vector normal to the corresponding planes PLG, PLD then makes it possible to determine the orientation of the presentation lens and thus the orientation of the correcting lens that is to be designed.

The two identification elements 700, 800 present the same structure as the two identification elements 70, 80 of the first embodiment but they are used in a different manner. Overall, in this second embodiment, the orientation of each correcting lens that is to be designed is determined from the orientation in the image-capture plane of the corresponding identification element 700, 800, whereas, in the first embodiment, the orientation of each correcting lens that is to be designed is determined not only from the corresponding horizontal identification element 70, 80, but also from the vertical identification element 60.

The method of determining the orientation of each correcting lens that is to be designed in this second embodiment is described below for the left lens, however it is naturally applicable to determining the right lens.

The frame of reference OXYZ is defined in the same manner as in the first implementation.

It is considered that the orientation of the plane PLG in the wearing configuration in which the image is captured, is the result of rotation in a plane initially parallel to the plane OXY (i.e. a facial plane) about the vertical axis OY through an angle ALPHA, and then of rotation about the horizontal axis OX through an angle BETA.

As shown in FIG. 14, assuming that the plane PLG is initially parallel to the vertical plane OXY, the crossbar that is fastened on the rim of the lens is oriented along the axis OX. The edge of the identification element 700 that has the geometrical pattern 701 is identified by its ends AB. Since the geometrical pattern 701 extends along the entire length of the edge, such taking account of the ends of the edge or of the ends of the geometrical pattern 701 give the same result. It is recalled that the longitudinal direction of the edge forms an angle THETA of about 30° relative to the longitudinal direction of the corresponding crossbar.

It is then assumed that in the wearing configuration, the edge represented by the segment of ends A, B is subjected, like the plane PLG, to rotation about the vertical axis OY through the angle ALPHA, and then to rotation about the horizontal axis OX through the angle BETA.

As in the first embodiment shown in FIG. 3, the image-capture means capture the image of the position-identification system 200 fastened on the frame carried by the head of the wearer. This image capture is performed in the image-capture plane PCI which is considered here as being parallel to the plane OXY.

The angles ALPHA and BETA are calculated using the captured image as follows. The processor and calculation system 93 measures the projected length LN of the segment AB on the horizontal axis OX, and the projected length LM of the segment AB on the vertical axis OY (FIG. 15) in the captured image and while taking account of the scale factor. As in the first embodiment, the holder bar is used to calculate the scale factor associated with the image-capture distance and with the focal length of the lens of the image-capture means.

The detailed calculations set out below involve equations that enable the angles ALPHA and BETA to be determined from the projected lengths LN and LM.

As mentioned above, the captured image provides a projection of the segment AB onto the plane OXY. To simplify calculation, it is assumed initially, i.e. before any rotation through an angle ALPHA or BETA, that the end A is situated on the axis OX and the end B is situated on the axis OZ. The coordinates of the points A and B are then as follows:

$$A(L*\cos(\text{THETA}),0,0)$$

and $$B(0,0,L*\sin(\text{THETA}))$$

The rotation matrix MAB that enables a rotation through the angle ALPHA about the axis OY to be applied followed by a rotation through the angle BETA about the axis OX is given as follows, in the OXY frame of reference:

| cos(ALPHA) | 0 | −sin(ALPHA) |
|---|---|---|
| −sin(ALPHA)*sin(BETA) | cos(BETA) | −sin(BETA)*cos(ALPHA) |
| sin(ALPHA) | cos(BETA) | cos(ALPHA)*cos(BETA) |

By applying this matrix to the coordinates of the points A, B of the segment AB, coordinates are obtained for points A', B' of the segment AB in the wearing configuration:

$$A'=(L*\cos(\text{THETA})*\cos(\text{ALPHA}),-L*\cos(\text{THETA})*\sin(\text{ALPHA})*\sin(\text{BETA}),-L*\cos(\text{THETA})*\cos(\text{BETA})*\sin(\text{ALPHA}))$$

and $$B'=(-L*\sin(\text{THETA})*\sin(\text{ALPHA}),-L*\sin(\text{THETA})*\sin(\text{BETA})*\cos(\text{ALPHA}),L*\sin(\text{THETA})*\cos(\text{ALPHA})*\cos(\text{BETA}))$$

By taking the first two coordinates for each point A', B', the following relationships can be deduced between the projected lengths LM and LM and the angles ALPHA and BETA:

$$LN=L*\cos(\text{THETA}-\text{ALPHA})$$

and $$LM=L*\sin(\text{BETA})*\sin(\text{THETA}-\text{ALPHA})$$

It is then possible to deduce ALPHA and BETA using the following relationships:

$$\text{ALPHA}=\arccos(NL/L)+\text{THETA}$$

and $$\text{BETA}=\arcsin(ML/L/\sin(\text{THETA}-\text{ALPHA}))$$

The processor system applies the rotation matrix MAB to the vector OZ of coordinates (0,0,1) in the OXYZ frame of reference, i.e. the vector that is normal to the plane PLG at the mounting cross point when it is considered initially, i.e. prior to any rotation, when it is parallel to the plane OXY. This provides the looked-for vector VAB normal to the plane PLG, where the plane PLG has been subjected to two rotations through the angles ALPHA and BETA. In the frame of reference OXYZ, this vector VAB has the following components:

$$VAB=(-\sin-\text{ALPHA}),-\sin(\text{BETA})*\cos(\text{ALPHA}),\cos(\text{ALPHA})*\cos(\text{BETA}))$$

The orientation of the left correcting lens is thus determined from the above-calculated vector VAB which is normal to the plane PLG in the wearing configuration.

The orientation of the right correcting lens is determined likewise by determining the components of the vector normal to the plane PLD at the mounting cross point in the wearing configuration.

As in the first implementation, the distance between each eye and the corresponding lens is determined by means of one or two prisms by measuring the deflection of the image of the pupil.

Once the orientation of each correcting lens to be designed and its distance from the corresponding eye has been determined, the configuration of the frame of reference for each lens relative to the frame of reference of the wearer, and in particular of the corresponding eye, is also known.

The processor system also proceeds to determine geometrico-morphological parameters known as index gradient distribution parameters, such as the pupillary distance, the pupillary half-distances, the height of each pupil, and the width and length dimensions of the rims of the frame.

In addition, as for the first embodiment, if the value determined for the angle ALPHA associated with the plane PLG is different from the value determined for the angle ALPHA relating to the plane PLD, and assuming that the frame is symmetrical, it is deduced that the wearer's head was turned through a given posture angle APIV about the axis OY. As above, this posture angle is determined which is proportional to the difference between the measured values for the angles ALPHA, and the length measured on the captured image are recalculated as a function of the posture angle as determined. It is also possible to perform one or more calculation iterations in order to obtain values that are more accurate for the angles ALPHA and BETA and for the measurements performed on the image.

As shown in FIGS. 12 and 13, provision is also made to provide an antenna 600 or stick that is secured to a circular base 601 and that points along the normal to said base. The base is disposed at the center of the edge of the holder bar 290 that faces the image-capture means 90 and that carries the geometrical pattern 293. As a result the antenna lies substantially in the horizontal plane PH.

Assuming that image capture is performed in a plane that is accurately parallel to the facial plane OXY and that the frame is symmetrical, the end of the antenna is situated in the captured image (i.e. in projection) at the center of the circular face of the base. Assuming that image capture is performed in a plane that is not parallel to the facial plane OXY and/or assuming that the frame is not symmetrical, the end of the antenna is offset horizontally relative to the center of the circular face of the base. The processor system then acts as a function of the offset distance measured for the end of the antenna to determine the posture angle APIV of the head and/or the asymmetry of the left and right portions of the frame. The processor system can also take account of measured values for the angles of rotation ALPHA of the lenses to determine accurately the value of the posture angle and the value of the asymmetry of the two lenses, where appropriate. Provision can be made to perform a plurality of iterations in order to obtain precise values for the angles of rotation ALPHA of the lenses and for the posture angle of the wearer's head.

The measurements performed on the image are then corrected as a function of the angle values as determined above.

With a symmetrical frame, the antenna can be used to position the wearer's head correctly prior to capturing the image, by ensuring that in projection onto the facial plane there is no offset between the end of the antenna and the center of the base, so as to have a head posture angle of zero.

The holder bar 290 is also used to orient the captured image in such a manner that the axis OX is properly situated in the horizontal plane. If a non-zero angle is measured between the longitudinal direction of the holder bar 290, which is the direction of the axis OX, relative to the horizontal direction of the captured image, then the processor system applies a rotation in the opposite direction and of the same value in order to reestablish the axis OX parallel to the horizontal.

The present invention is not limited in any way to the embodiments described and shown, and the person skilled in the art knows how to provide any variant in accordance with its spirit.

In a variant, provision can be made for the device to be designed to operate with an orientation of Frankfurt's plane that is not parallel to the horizontal plane PH of the terrestrial frame of reference. It is then possible with the first and second embodiments described above, to perform the same methods but assuming that the vertical direction is defined relative to the wearer and not relative to the terrestrial frame of reference. In other words, the vertical direction is then defined as being the direction perpendicular to the primary gaze axis of the wearer and contained in the sagittal plane PSAG. The horizontal plane perpendicular to the vertical direction is then defined as coinciding with Frankfurt's plane.

The methods described for use with the first and second embodiments and their variants can also be applied with a pair of eyeglasses of the pierced type. Under such circumstances, each crossbar is fastened directly to the corresponding presentation lens. The calculations for measurements performed relating to the rims (shape, orientation) in the above description are then performed relative to the presentation lenses mounted on the pierced type frame. In a variant, for a rimmed type frame, provision can be made to perform those methods using a frame that does not have presentation lenses. Under such circumstances, the prism rods bear against the rims of the frame. It is also possible for each rim to define overall mean plane passing through the mounting cross position. The method described above for the first and second implementations are then performed to discover the orientation of said planes.

Still for a frame of the rimmed type, it is possible to provide only one left or right presentation lens, it being assumed that the configuration of the frame of reference for the other lens can be deduced symmetrically relative to the plane of symmetry of the frame. Under such circumstances, it is possible to keep two identification elements associated with the two eyes in order to determine any possible posture angle. It is also possible to provide only one identification element associated with only one of the two eyes, while assuming that the head is indeed straight and that the plane of symmetry of the frame coincides with the sagittal plane.

In a variant, for calculating the distance between the lens and the corresponding eye using only one prism, it is possible to measure the offset distance by eye by using graduations carried on the bottom edge of the prism or by taking a measurement manually by means of a rule.

The invention claimed is:

1. A method of determining, under wearing conditions, at least one component of the orientation of a correcting ophthalmic lens of eyeglasses relative to the head of the future wearer, the method comprising the steps of:
    mounting a position-identification system (20; 200) on the frame (10) and/or on a presentation lens (100, 101) fitted to the frame, the identification system comprising at least one identification element (60, 70, 80; 700; 800) having at least one known geometrical characteristic;
    capturing an image of the identification element (60, 70, 80; 700; 800) in two dimensions in a vertical facial plane (PCI) by means of an image-capture apparatus;
    processing the captured image of the identification element to measure therein a geometrical characteristic that depends on the known geometrical characteristic of the identification element; and
    calculating at least one component of the orientation of the lens by comparing the measured geometrical characteristic of the captured image of the identification element with the known geometrical characteristic of the identification element, wherein,
    the position-identification system (20) includes at least one horizontal identification element (70) and means (25, 26) for mounting said element directly or indirectly on a rim (11) of the frame (10) or on a presentation lens (100) fitted to the frame (10), the horizontal identification element (70) being arranged so that the measured geometrical characteristic of the captured image of the identification element depends on the horizontal component, about a substantially vertical axis, of the orientation of said rim (11) of the frame (10) or of said presentation lens (100) relative to the head of the wearer, and
    at least one horizontal component of the orientation of the correcting lens relative to the head of the wearer is calculated as a function of said comparison.

2. A method according to claim 1, in which:
    the position-identification system (20) comprises at least two horizontal identification elements (70, 80), of which a first horizontal identification element (70) is mounted directly or indirectly on one of the two rims (11) of the frame (10) or on one of the two presentation lenses (100) fitted to the frame (10), and of which a second horizontal identification element (80) is mounted on the other rim (12) of the frame (10) or on the other presentation lens (101);
    the capture step comprises capturing an image of the horizontal identification element (70, 80) in two dimensions in a facial plane (PCI);
    the processing step comprises processing said captured image to measure therefrom, for each identification element, a geometrical characteristic depending on the known geometrical characteristic of the corresponding identification element; and
    the comparison step comprises making comparisons between the measured geometrical characteristics of the captured image of the identification elements with the known geometrical characteristic corresponding to said horizontal identification elements (70, 80), and calculating at least one horizontal component of the orientation of each correcting lens relative to the head of the future wearer, as a function of said comparison.

3. A method according to claim 2, in which a posture angle (APIV) corresponding to the horizontal component (APIV) of the orientation of the bisector of the eyes (A0) relative the image-capture apparatus is calculated as a function of the comparisons of the measured geometrical characteristics of the captured image of the horizontal identification elements (70, 80) with the corresponding known geometrical characteristics.

4. A method according to claim 1, in which the identification system (20) includes at least one vertical identification element (60) and means (25, 26) for directly or indirectly mounting said element on a rim (11) of the frame (10) or on a presentation lens (100) fitted to the frame (10), said vertical identification element (60) being arranged so that the measured geometrical characteristic of the captured image of said identification element depends on the vertical component, about an axis that is substantially horizontal and perpendicular to the sagittal plane (PSAG) of the wearer, of the orientation of said rim (11) of the frame (10) or of said presentation lens (100) relative to the head of the wearer, and in which at least one vertical component of the orientation of the correcting lens relative to the head of the wearer is calculated as a function of said comparison.

5. A method according to claim 1, in which the distance (X) between the image-capture means (90) and the position-identification system (20) is measured.

6. A method according to claim 3, in which at least one of the following personalization parameters is measured in the captured image taking account of a scale factor: the pupillary distance (PDS); the pupillary half-distances (PDS1, PDS2); the width and height dimensions (A and B) of each presentation lens (100, 101); and the height (HG, HD) of each lens.

7. A method according to claim 6, in which the values measured on the captured image of the pupillary distance (PDS), of the pupillary half-distances (PDS1, PDS2), and of the width dimension (A) of each presentation lens (100, 101) are corrected as a function of the measured posture angle (APIV), and in which the values for the height (B) of each presentation lens and for the height (HG, HD) of each pupil are corrected as a function of the vertical component of the calculated orientation.

8. A method according to claim 6, in which the distance (X) between the image-capture means (90) and the position-identification system (20) is measured, and the pupillary distance (PDS) and/or the pupillary half-distances (PDS1, PDS2) are calculated for the wearer looking at infinity, as a function of the distance (D) between the image-capture means (90) and the position-identification system (20).

9. A method of personalized optical design of a correcting ophthalmic lens comprising both performing the method of determining at least one component of the orientation of the correcting lens relative to the head of the future wearer according to claim 1, and calculating the shapes of one and/or the other of the optically useful faces of the lens and/or the index gradients of the lens as a function of the determined component(s) of the orientation of the correcting lens.

10. A computer program product including instructions for implementing a personalized optical design method for a correcting ophthalmic lens in accordance with claim 9.

11. A computer program product including instructions for implementing a method of determining at least one orientation component of a correcting lens relative to the head of a future wearer in accordance with claim 1.

12. A method according to claim 1, in which at least one of the following personalization parameters is measured in the captured image taking account of a scale factor: the pupillary distance (PDS); the pupillary half-distances (PDS1, PDS2); the width and height dimensions (A and B) of each presentation lens (100, 101); and the height (HG, HD) of each lens.

13. A device for determining, under wearing conditions, at least one component of the orientation of a correcting ophthalmic lens of eyeglasses relative to the head of the future wearer, the device comprising:
- a position-identification system (20; 200) comprising firstly means (25, 26) enabling it to be fastened on the frame (10) or on at least one presentation lens mounted on said frame, and secondly at least one identification element (60, 70, 80; 700, 800) having at least one known geometrical characteristic;
- an image-capture apparatus suitable for capturing the two-dimensional image (90) in a vertical facial plane (PCI) of the identification element (60, 70, 80; 700, 800) when the position-identification (20; 200) is fastened on the frame (10) carried by the wearer; and
- calculation and processor means for acting on the captured image firstly to measure a geometrical characteristic depending on the known geometrical characteristic of the identification element, and secondly to calculate at least one component of the orientation of the lens as a function of said measured geometrical characteristic of the captured image of the identification element and as a function of the known geometrical characteristic of the identification element, wherein,
- the position-identification (20) comprises at least one horizontal element (70; 700) and means (25, 26) for mounting said element directly or indirectly on a rim (11) of the frame (10) or on a presentation lens (100) fitted to the frame (10), said horizontal identification element (70; 700) being arranged so that the measured geometrical characteristic of the captured image of the identification element depends on the horizontal component of the orientation of said rim (11) of the frame (10) or of said presentation lens (100) relative to the head of the wearer, and
- the calculation means are designed to calculate at least one horizontal component of the orientation of the correcting lens relative to the head of the wearer, as a function of said comparison.

14. A device according to claim 13, in which the position-identification (20) includes at least first and second horizontal identification elements (70, 80; 700, 800), and mounting means (25, 26, 27, 28) for mounting the first horizontal identification element (70; 700) on one of the two rims (11) of the frame (10) or on one of the two presentation lenses (100) fitted to the frame (10) and the second horizontal identification element (80; 800) on the other rim (12) of the frame (10) or on the other presentation lens (101).

15. A device according to claim 13, in which both identification elements (70, 80; 700, 800) are mounted hinged about a pivot axis (A1) that is substantially vertical.

16. A device according to claim 13, including means for measuring the distance (X) between the image-capture means (90) and the position-identification system (20).

17. A device according to claim 13, in which the known geometrical characteristic of the identification element (60, 70, 80; 700, 800) comprises a geometrical pattern (61, 71, 81; 701, 801) designed in such a manner that the geometrical configuration of said geometrical pattern (61, 71, 81; 701, 801) projected onto said front image-capture plane (PCI) is representative of at least one component of the orientation of said identification element (60, 70, 80; 700, 800).

18. A device according to claim 13, including at least one prismatic-effect optical element (31) associated with one of the two eyes (OG, OD) of the wearer, the element presenting an edge (33; 34) parallel to the direction of its prismatic effect and being mounted to move in translation substantially vertically relative to the position-identification system (20; 200) so as to be capable of being placed in a measurement position such that said edge (33; 34), when seen in front view, intersects the pupil (PG) of the eye (OG) so as to offset the image of a portion (PGS) of the pupil (PG), and in which the processor means (93) are designed to respond to the image of the portion (PGS) of the pupil (PG) offset by the prismatic-effect optical element (31) to deduce the distance between the presentation lens (100) fitted to the frame and the corresponding eye (OG).

19. A device according to claim 18, having a single prismatic-effect optical element (31) for the eye under consideration.

20. A device according to claim 13, in which, for said identification element (60, 70, 80; 700, 800) having at least one known geometrical characteristic representative of the orientation of the frame (10) or of the presentation lens, said fastener means enable the system to tilt on the frame about an axis that is substantially horizontal and contained in the mid-plane of the frame or of the presentation lens.

21. A device according to claim 20, in which resilient or gravity return means are provided for tilting the position-identification system against the presentation lens (100, 101) or the frame (10).

* * * * *

UNITED STATES PATENT AND TRADEMARK OFFICE
CERTIFICATE OF CORRECTION

PATENT NO. : 8,220,922 B2
APPLICATION NO. : 12/441171
DATED : July 17, 2012
INVENTOR(S) : Jean-Pierre Chauveau et al.

It is certified that error appears in the above-identified patent and that said Letters Patent is hereby corrected as shown below:

In column 18, lines 48-56, the layout should read as follows:

--(A'= (L*cos(THETA)*cos(ALPHA),
  -L*cos(THETA*sin(ALPHA)*sin(BETA),
  -L*cos(THETA)*cos(BETA)*sin(ALPHA))

and

B'= (-L*sin(THETA)*sin(ALPHA),
  -L*sin(THETA)*sin(BETA)*cos(ALPHA),
  L*sin(THETA)*cos(ALPHA)*cos(BETA)--.

In column 19, lines 16-17, should read as follows:

--VAB=(-sin-ALPHA),-sin(BETA)*cos(ALPHA),cos(ALPHA)*cos(BETA)--

Signed and Sealed this
Eighteenth Day of September, 2012

David J. Kappos
*Director of the United States Patent and Trademark Office*